(12) United States Patent
Raczuk

(10) Patent No.: US 9,505,113 B2
(45) Date of Patent: Nov. 29, 2016

(54) ASSEMBLY TOOL AND METHOD OF USING

(71) Applicant: Richard C Raczuk, Lake Havasu, AZ (US)

(72) Inventor: Richard C Raczuk, Lake Havasu, AZ (US)

( * ) Notice: Subject to any disclaimer, the term of this patent is extended or adjusted under 35 U.S.C. 154(b) by 261 days.

(21) Appl. No.: 13/947,812

(22) Filed: Jul. 22, 2013

(65) Prior Publication Data

US 2014/0020225 A1    Jan. 23, 2014

Related U.S. Application Data

(60) Provisional application No. 61/674,186, filed on Jul. 20, 2012.

(51) Int. Cl.
| | |
|---|---|
| *B25B 27/10* | (2006.01) |
| *F16L 33/207* | (2006.01) |
| *F16L 1/09* | (2006.01) |
| *B25B 1/10* | (2006.01) |
| *B25B 1/20* | (2006.01) |

(52) U.S. Cl.
CPC ............... *B25B 27/10* (2013.01); *B25B 1/103* (2013.01); *B25B 1/20* (2013.01); *F16L 1/09* (2013.01); *F16L 33/2073* (2013.01); *Y10T 29/49826* (2015.01); *Y10T 29/49947* (2015.01); *Y10T 29/53* (2015.01); *Y10T 29/5367* (2015.01); *Y10T 29/53091* (2015.01)

(58) Field of Classification Search
CPC ......... B25B 27/10; B25B 1/20; B25B 1/103; F16L 1/09; F16L 33/2073; Y10T 29/53091; Y10T 29/53; Y10T 29/49947; Y10T 29/5367; Y10T 29/49826
See application file for complete search history.

(56) References Cited

U.S. PATENT DOCUMENTS

| | | | | |
|---|---|---|---|---|
| 2,878,026 A | * | 3/1959 | Pioch ............................... 279/7 |
| 3,132,673 A | * | 5/1964 | Bamford .................. B27L 5/02 |
| | | | | 144/209.1 |
| 4,619,446 A | * | 10/1986 | Yang ............................... 269/88 |
| 2014/0020231 A1 | * | 1/2014 | Raczuk ....................... 29/525.01 |

* cited by examiner

*Primary Examiner* — John C Hong
(74) *Attorney, Agent, or Firm* — Taft Stettinius & Hollister LLP

(57) ABSTRACT

The present disclosure provides an apparatus having a base with at least one guide formed along a length thereof. A fitting clamp and a tube clamp are coupled to the base and spaced apart from one another. A drive mechanism is operable for moving at least one clamp relative to the other clamp along the guide of the base so as to slidingly assemble a tube and fitting together.

5 Claims, 18 Drawing Sheets

ASSEMBLY TOOL AND METHOD OF USING

CROSS REFERENCE TO RELATED APPLICATIONS

The present application claims the benefit of U.S. Provisional Patent Application No. 61/674,186 filed Jul. 20, 2012, and is incorporated herein by reference.

The present invention relates generally to a tool and method of assembling a fitting with a hose. More specifically, one form of the present invention is directed to the assembly of a barb fitting with a hose. The present application contemplates a wide variety of fittings having a variety of geometries, configurations and materials. The present application further contemplates a variety of hoses having differing material, stiffness's and sizes. In one form the present application contemplates a barb fitting.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DETAILED DESCRIPTION

Figure 1:
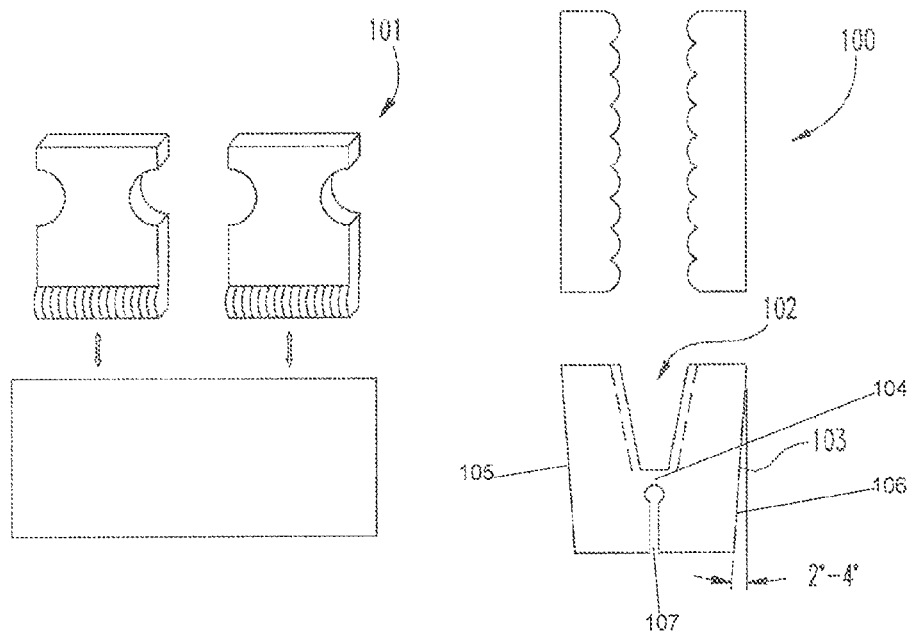
FIG. 1 is an illustration of front, top and side views of a first embodiment of a tube and fitting assembly tool.
Figure 1:
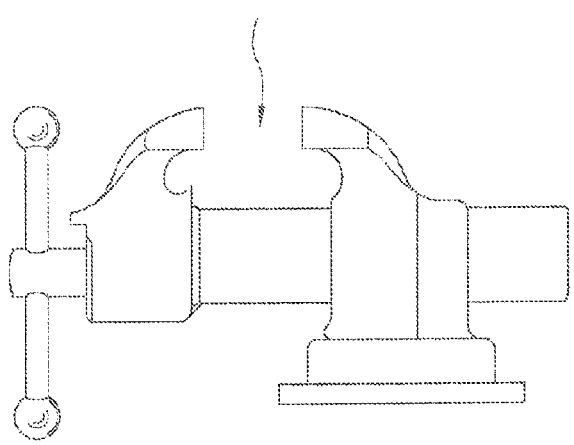
Figure 2:
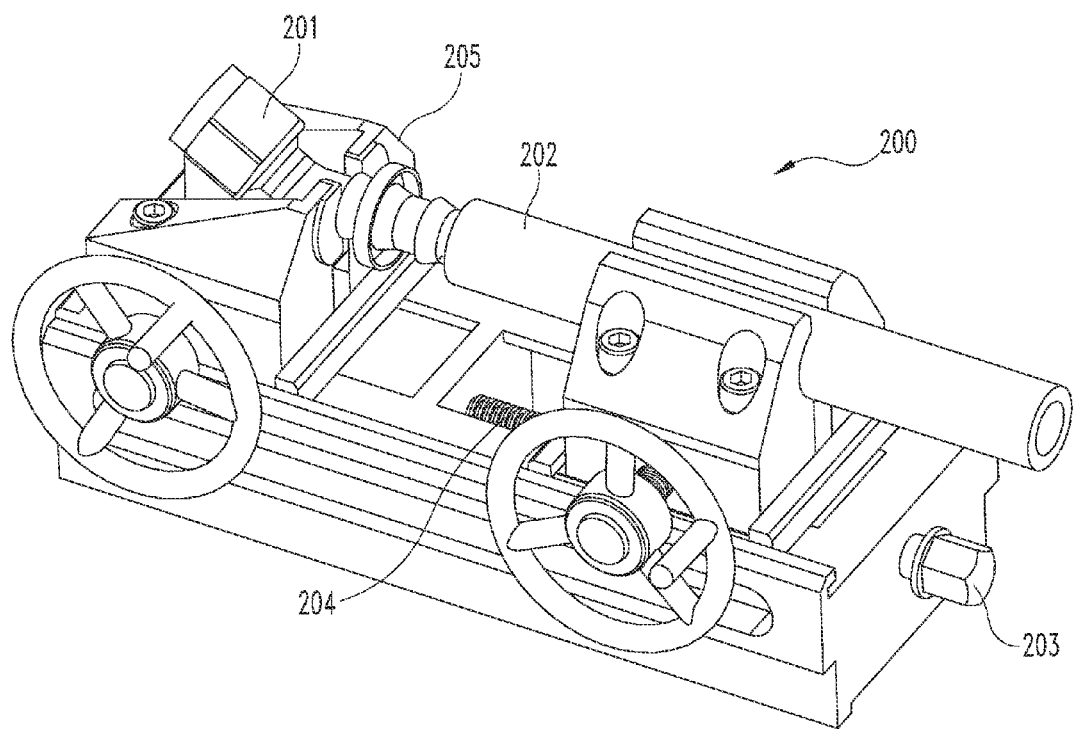
FIG. 2 is a top perspective view of a tube and fitting assembly tool according to another embodiment of the present disclosure.
Figure 3:
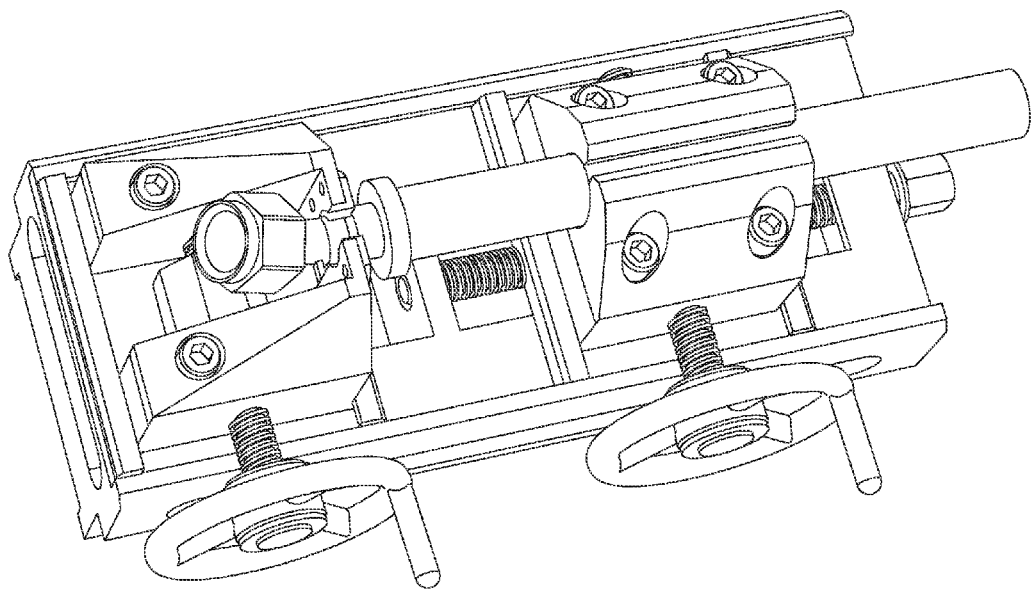
FIG. 3 is another top perspective view of the assembly tool of FIG. 2.
Figure 4:
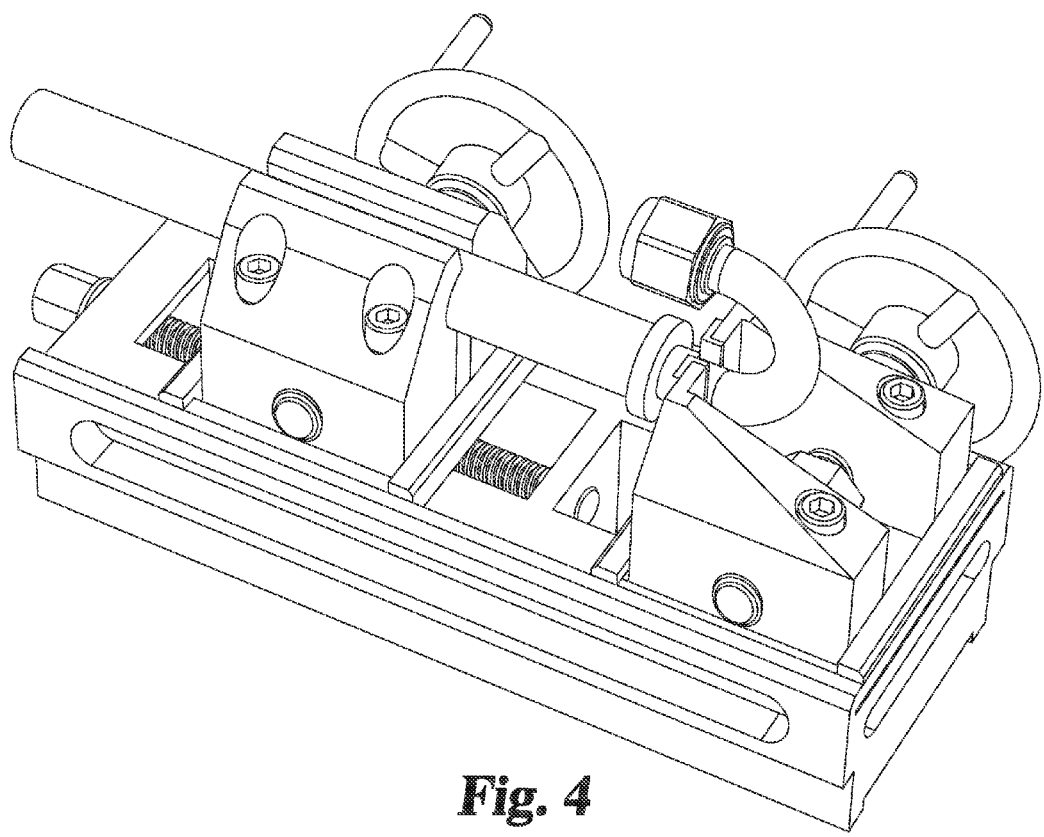
FIG. 4 is another top perspective view of the assembly tool of FIG. 2.
Figure 5:
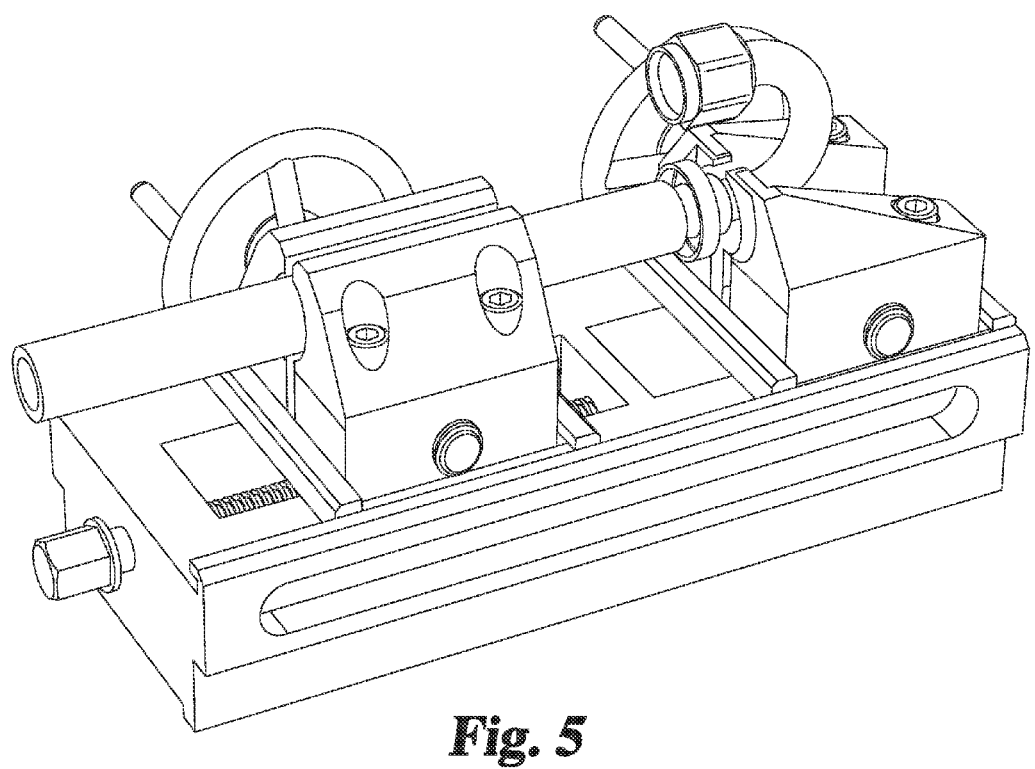
FIG. 5 is another top perspective view of the assembly tool of FIG. 2.
Figure 6:
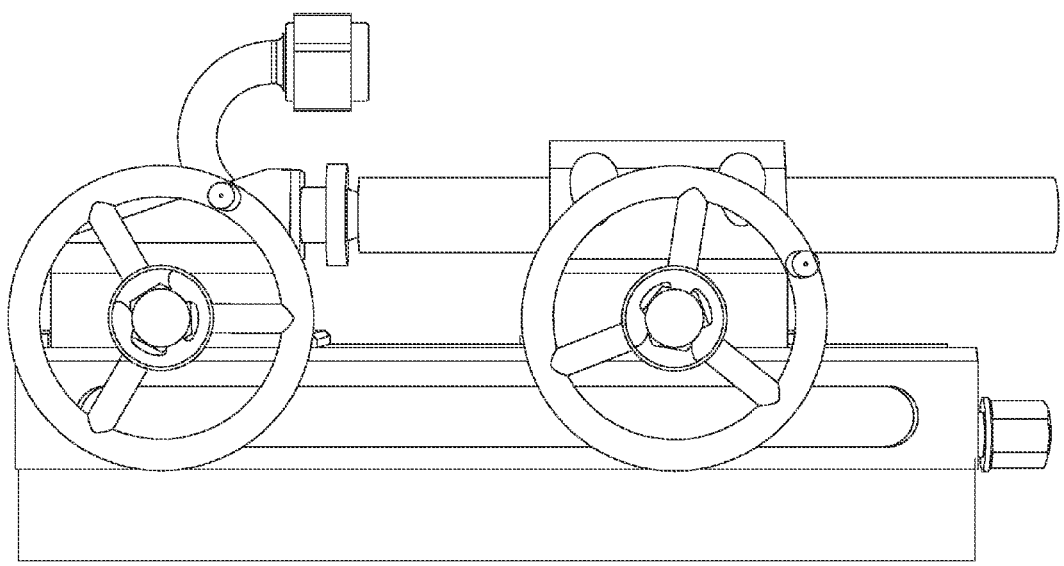
FIG. 6 is a side perspective view of the assembly tool of FIG. 2.
Figure 7:
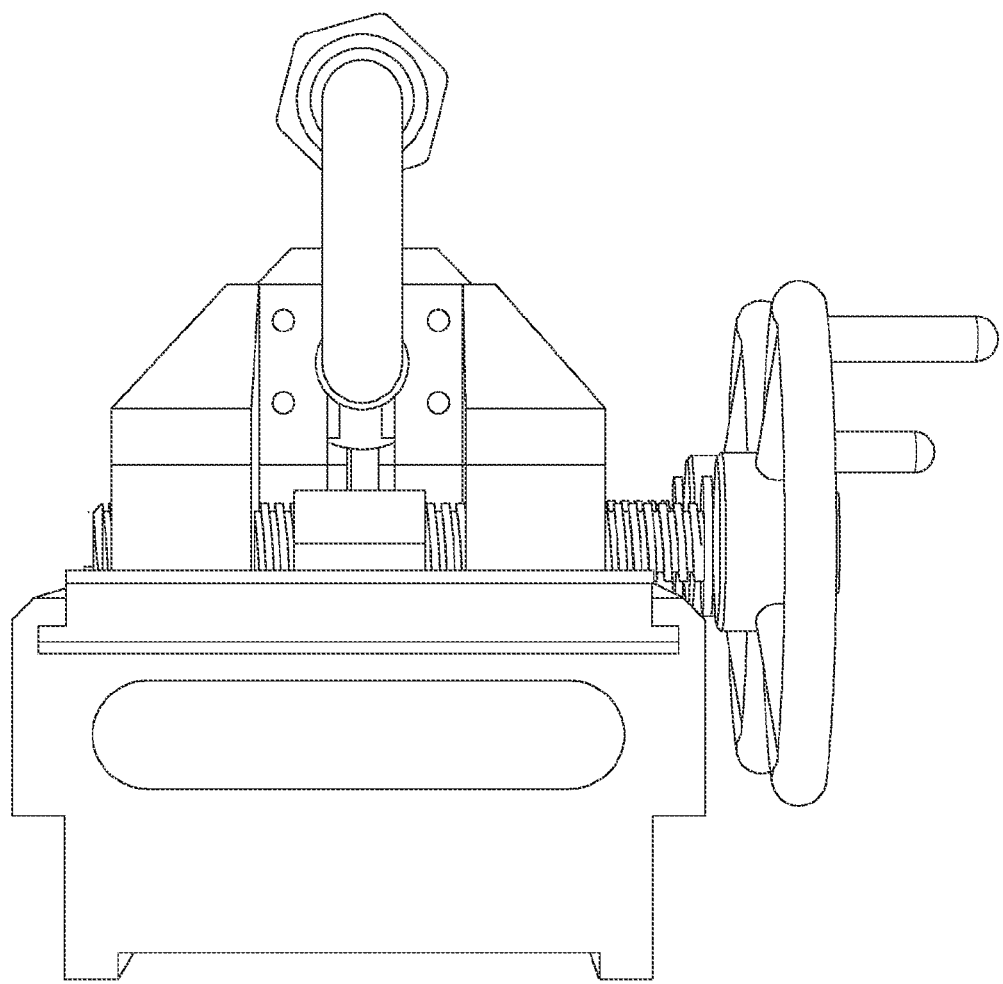
FIG. 7 is an end perspective view of the assembly tool of FIG. 2.
Figure 8:
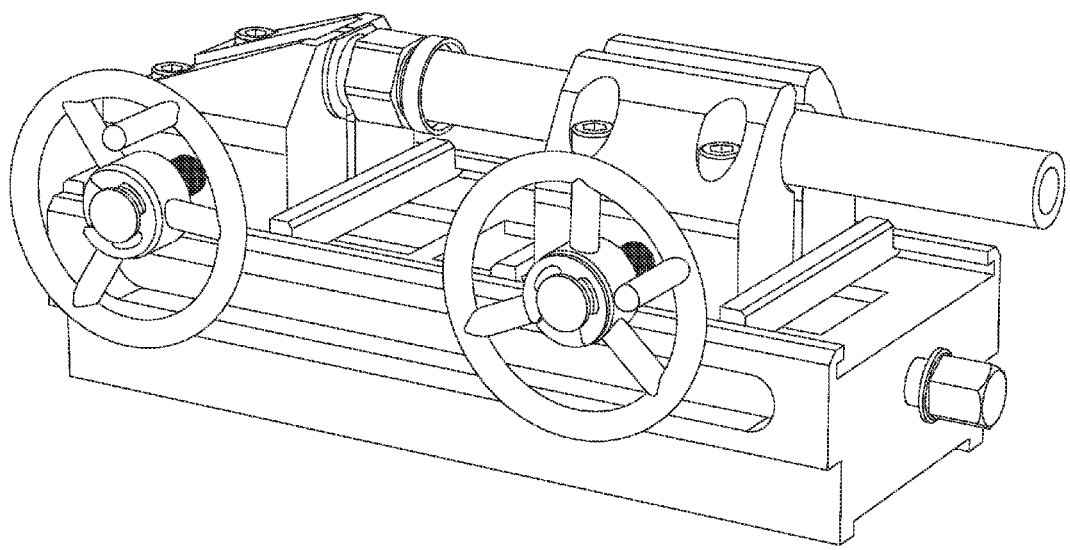
FIG. 8 is another side perspective view of the assembly tool of FIG. 2.
Figure 9:
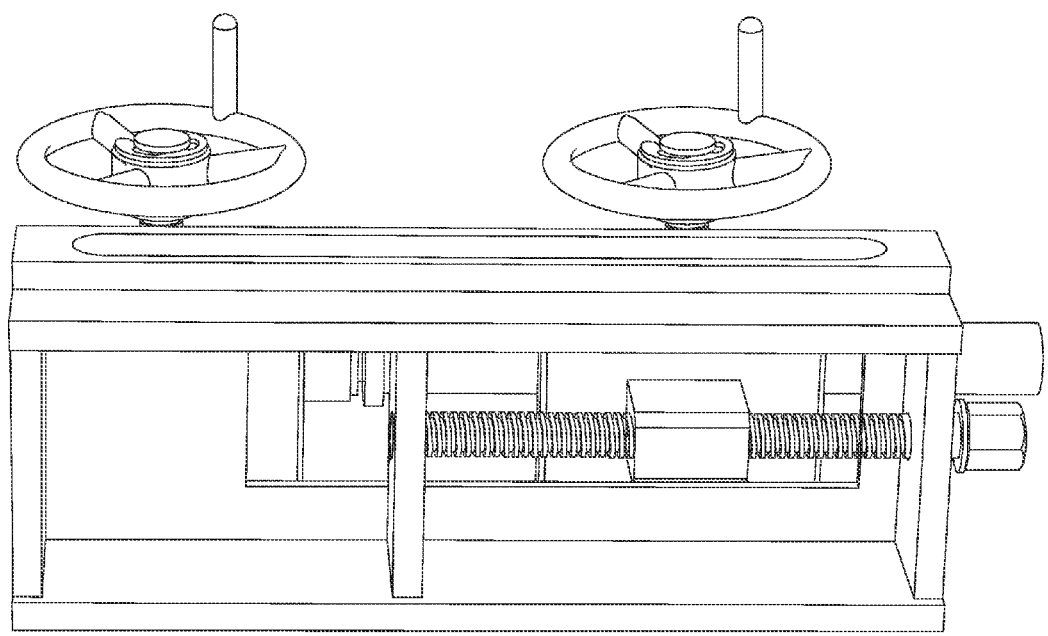
FIG. 9 is a bottom perspective view of the assembly tool of FIG. 2.
Figure 10:
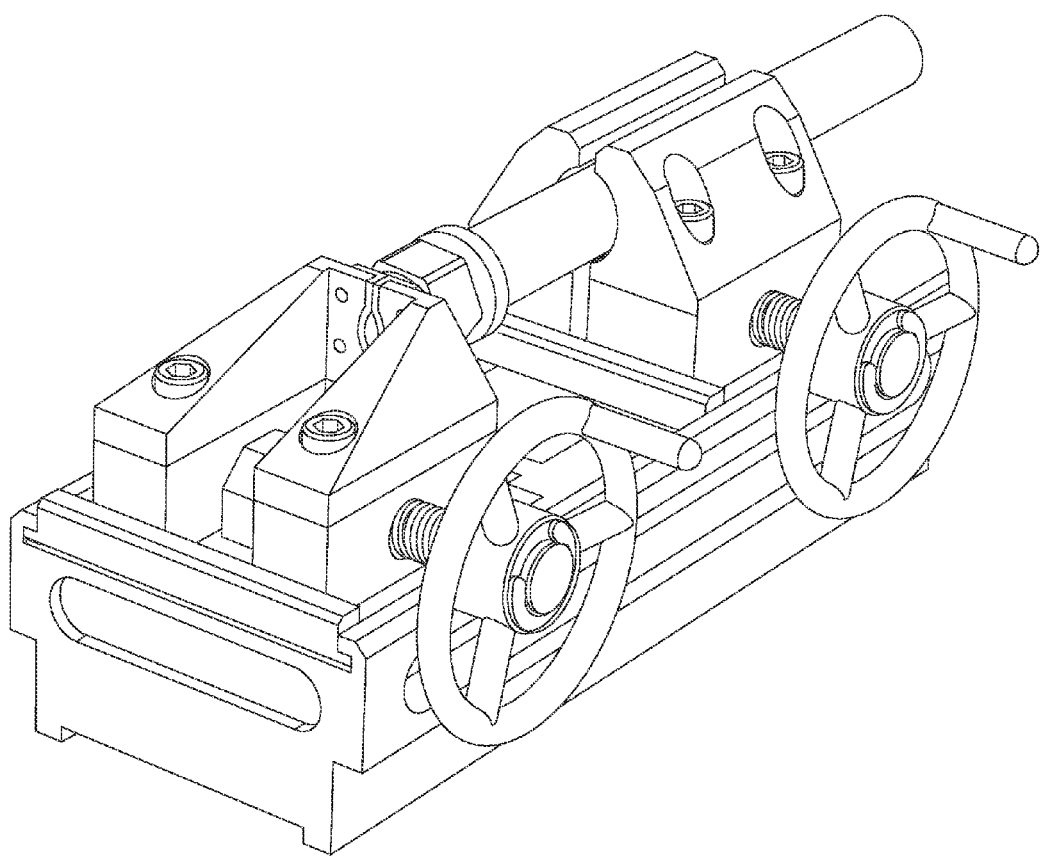
FIG. 10 is another top perspective view of the assembly tool of FIG. 2.

With reference to FIG. 1, there is illustrated one form of an assembly tool 100. Assembly tool 100 includes a plurality of fitting adapters 101 that are received within a channel 102 of a tool body 103. Tool body 103 is placed within the vice and the jaws as tightened holds the fitting adapters 101 securely. It is understood that the fitting adapters are adapted to hold a fitting during the hose assembly process. With the fitting firmly retained within the fitting adapter 101 and held in the vice the end of the hose is advanced over the end of the fitting. In one form the hose is advanced by a technician manually pushing the hose over the fitting.

FIG. 1 depicts a substantially H-shaped housing 103 having a hinge portion 104 formed between first 105 and second 106 arms. A fitting adapter receiving slot 102 is formed between the arms 105, 106 on one side of the hinge portion 104 and an actuator slot 107 is formed between the arms 105, 106 on an opposing side of the hinge portion 104. At least two fitting adapters 101 are configured to engage with the adaptor receiving slot 102 and form a fitting holding aperture therebetween.

With reference to FIGS. 2-10, there is illustrated one form of an assembly tool 200. Assembly tool 200 is operable to engage a fitting 201 with a hose 202. The fitting 201 and hose 202 are coupled with their respective carriers and by the driving of screw 204 through the application of torque to end 203 the hose is pushed over the barbs of the fitting 201. One mechanism contemplated to drive the screw 204 is an impact wrench or a socket wrench. In one alternate form the barbs of the fitting 201 can be driven into the inside of the hose 202. The present application contemplates a retaining end in the tool 200 that includes a plurality of changeable fittings 205 that are configured to hold different sizes and styles of fittings 201. The present application further contemplated the movement of the hose onto the barb by other mechanical means including pneumatic, hydraulic, impact mechanisms in place of the screw 204.

Figure 11:
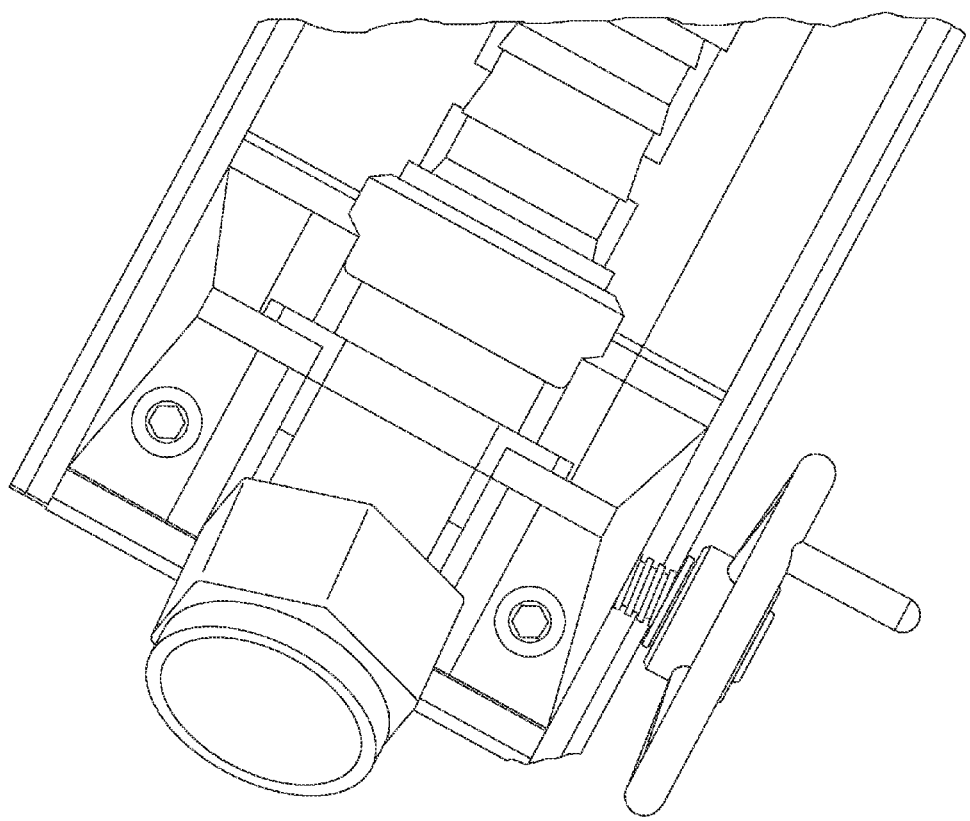
FIG. 11 is an enlarged perspective view of a portion of the assembly tool of FIG. 2.
Figure 12:
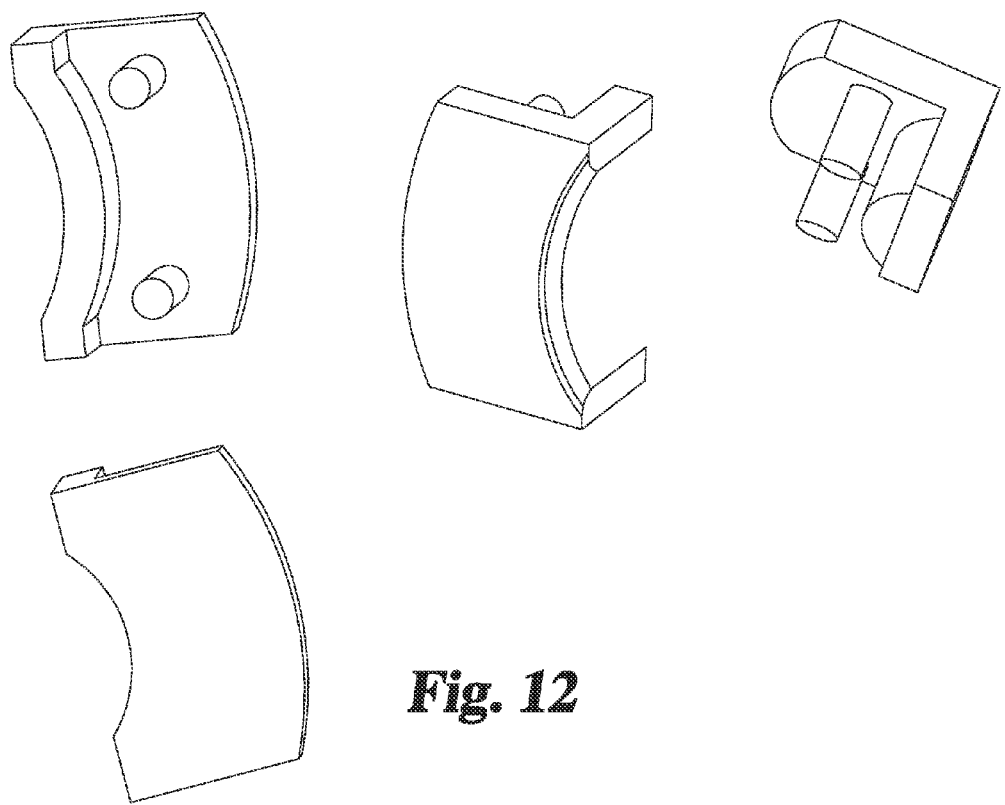
FIG. 12 is a perspective view of collet inserts used with the assembly tool of FIG. 2.

With reference to FIGS. 11-12, there is illustrated one embodiment of the changeable fittings 205 designed to nest with and clamp the fitting 201. A variety of different sizes and configurations are contemplated herein.

Figure 13:
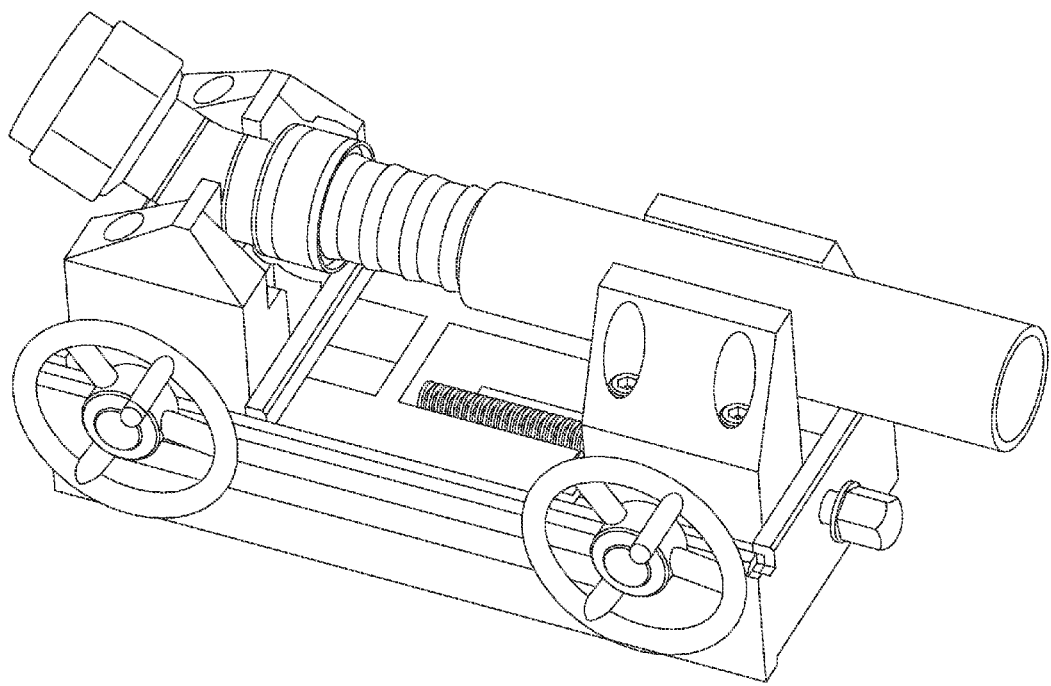
FIG. 13 is another top perspective view of the assembly tool of FIG. 2.
Figure 14:
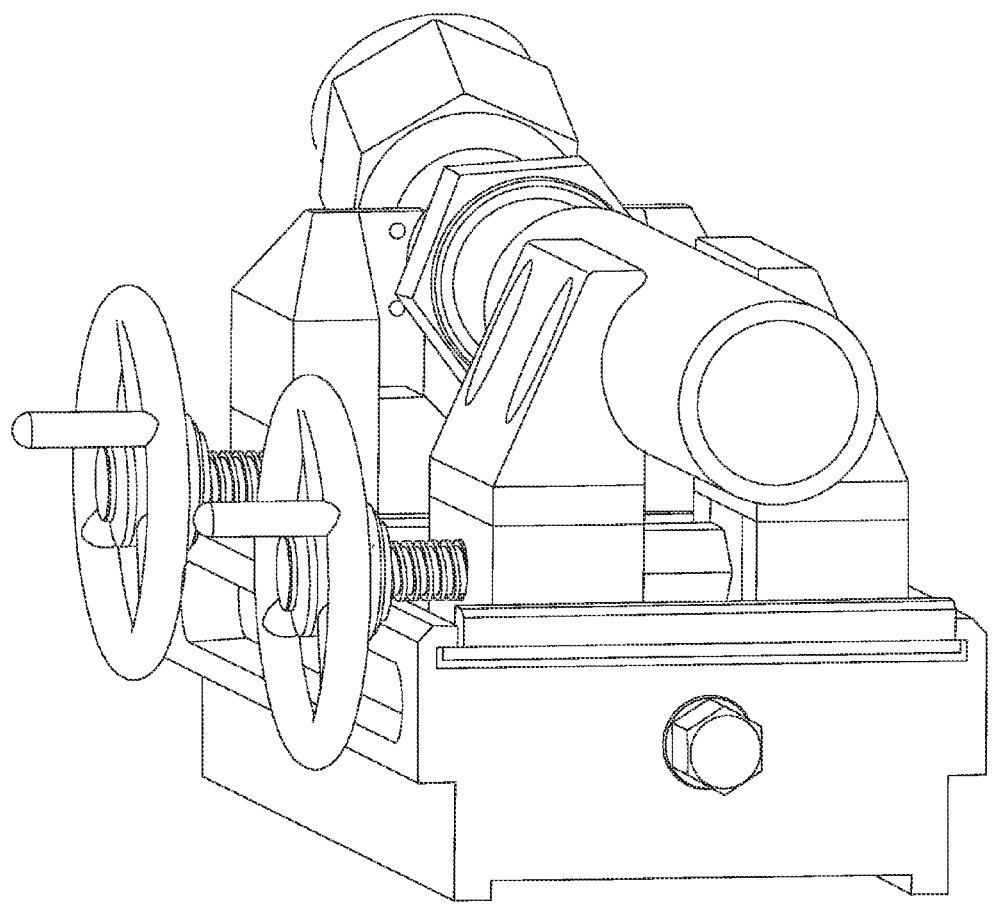
FIG. 14 is another end perspective view of the assembly tool of FIG. 2.
Figure 15:
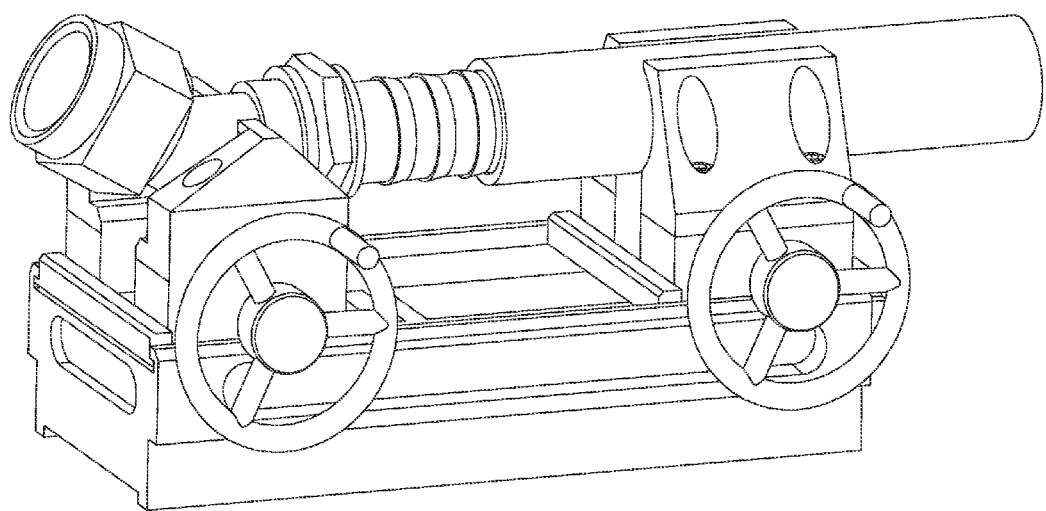
FIG. 15 is another side perspective view of the tube assembly tool of FIG. 2.

With reference to FIGS. 13-15, there is set forth further illustrations of a tool utilizable for coupling a hose with a fitting together.

Figure 16:
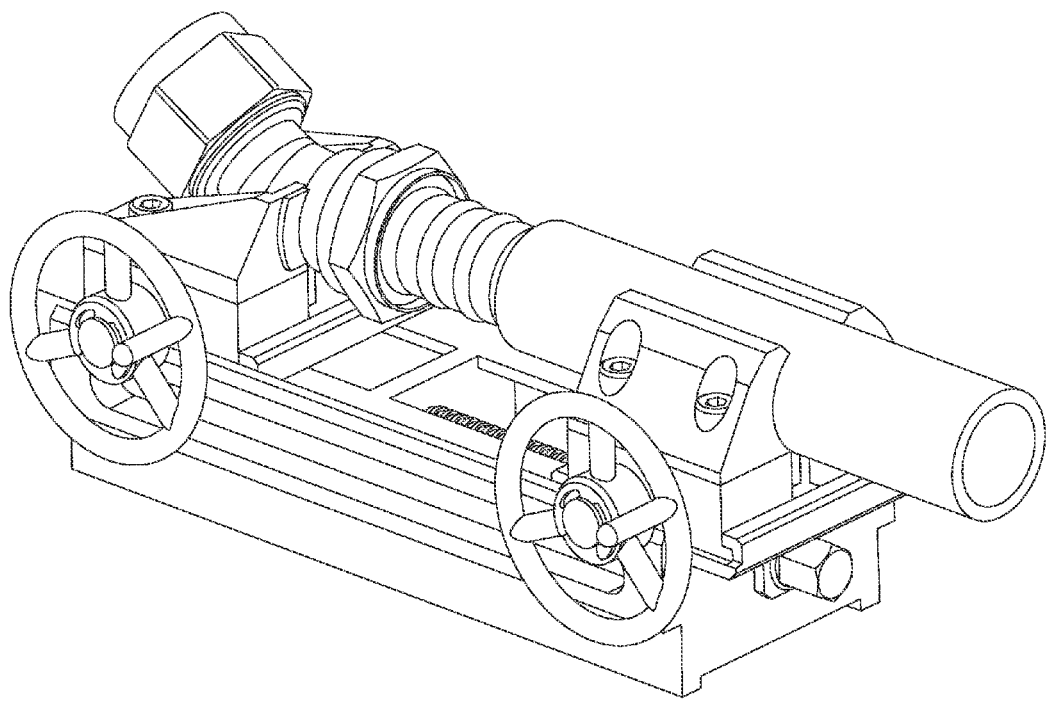
FIG. 16 is another top perspective view of the assembly tool of FIG. 2.
Figure 17:
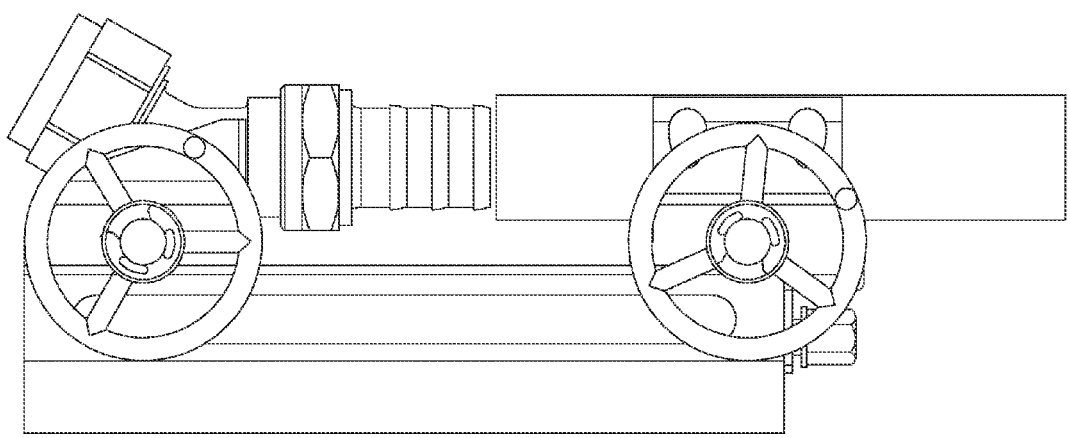
FIG. 17 is another side perspective view of the assembly tool of FIG. 2.
Figure 18:
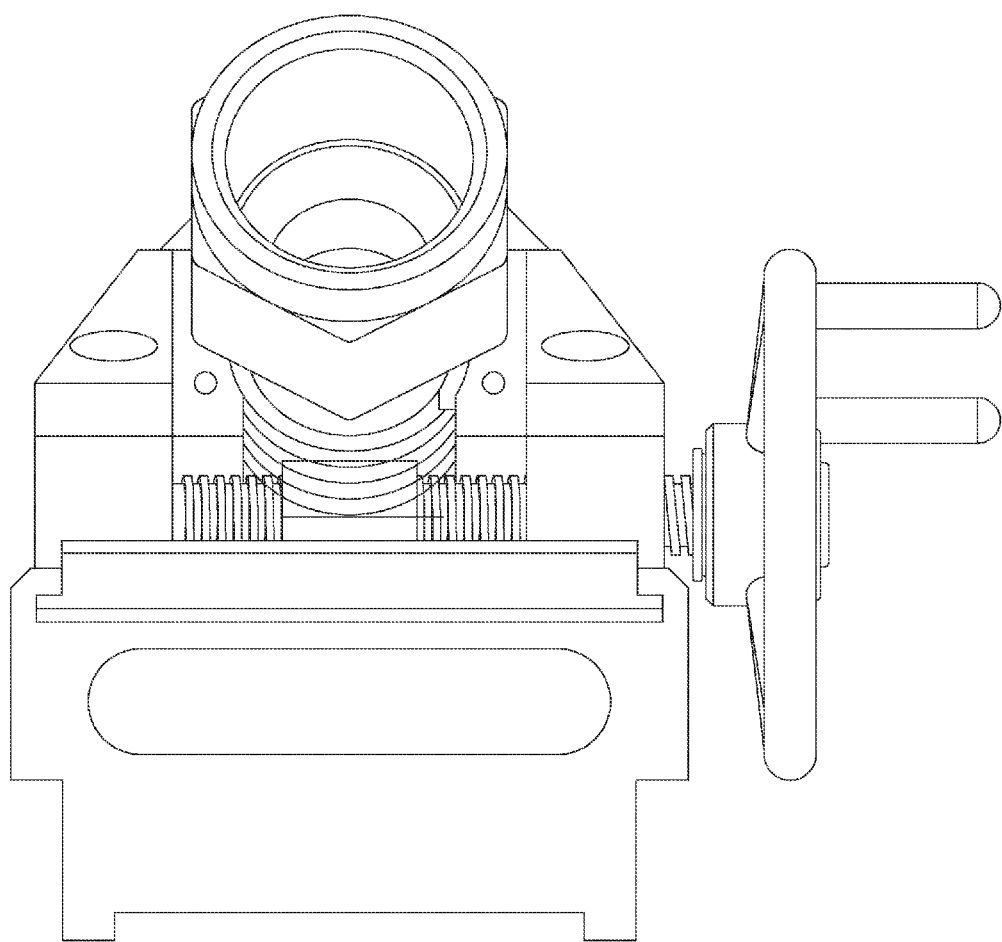
FIG. 18 is another end perspective view of the assembly tool of FIG. 2.

With reference to FIGS. 16-18, there is illustrated additional material related to a tool for coupling fittings with a hose.

The present application contemplates in one form a tool have the capability to handle a variety of sizes of hoses and fittings. The fittings may be of a variety of configurations and can be straight, angled or of other configurations. A tool may be set up for a fixed mount for a specific configuration of fitting or may be a tool having the ability to utilize a variety of adapters to accommodate many different types and/or sizes of fittings.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable. Further, when the language "at least a portion" and/or "a portion" is used the item may include a portion and/or the entire item unless specifically stated to the contrary.

What is claimed is:

1. An apparatus comprising:
    a substantially H-shaped housing having a hinge portion formed between first and second arms;
    a fitting adapter receiving slot formed between the arms on one side of the hinge portion;
    an actuator slot formed between the arms on an opposing side of the hinge portion; and
    at least two fitting adapters configured to engage with the adaptor receiving slot and form a fitting holding aperture therebetween.

2. The apparatus of claim 1, wherein the fitting adapter receiving slot includes tapered walls.

3. The apparatus of claim 1, wherein each fitting adapter includes a tapered root portion configured to engage with the fitting adapter receiving slot of the H-shaped housing.

4. The apparatus of claim 1, wherein the arms of the housing are operable to move about the hinge portion such that the adapter slot and actuator slot expand and contract in alternating fashion.

5. The apparatus of claim 1, wherein a fitting is held between adjacent adaptors in the housing to permit a tube to be coupled thereto.

* * * * *